(12) United States Patent
Rivas et al.

(10) Patent No.: US 8,096,748 B2
(45) Date of Patent: Jan. 17, 2012

(54) APPARATUS AND METHOD FOR DOUBLE FLOW TURBINE FIRST STAGE COOLING

(75) Inventors: Flor Del Carmen Rivas, Clifton Park, NY (US); Nestor Hernandez, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 916 days.

(21) Appl. No.: 12/120,862

(22) Filed: May 15, 2008

(65) Prior Publication Data
US 2009/0285670 A1 Nov. 19, 2009

(51) Int. Cl.
*F01D 5/08* (2006.01)
(52) U.S. Cl. ............... 415/1; 415/93; 415/103; 415/115; 415/178; 415/180; 416/97 R
(58) Field of Classification Search ............... 415/1, 93, 415/94, 100, 103, 115, 178, 180; 416/97 R
See application file for complete search history.

(56) References Cited

U.S. PATENT DOCUMENTS

| 3,817,654 | A | * | 6/1974 | Sohma | 415/103 |
| 4,571,153 | A | * | 2/1986 | Keller | 415/117 |
| 4,634,340 | A | * | 1/1987 | Stetter | 415/95 |
| 5,575,620 | A | | 11/1996 | Haller et al. | |
| 5,593,273 | A | | 1/1997 | Brinkman | |
| 6,048,169 | A | * | 4/2000 | Feldmuller et al. | 415/115 |
| 6,082,962 | A | * | 7/2000 | Drosdziok et al. | 415/115 |
| 6,102,654 | A | * | 8/2000 | Oeynhausen et al. | 415/115 |
| 6,234,746 | B1 | | 5/2001 | Schroder et al. | |
| 6,331,097 | B1 | | 12/2001 | Jendrix | |
| 6,364,613 | B1 | | 4/2002 | Deallenbach et al. | |
| 7,040,861 | B2 | | 5/2006 | Clifford et al. | |
| 7,322,789 | B2 | * | 1/2008 | Burdgick | 415/103 |
| 2007/0065273 | A1 | | 3/2007 | Cornell | |

* cited by examiner

*Primary Examiner* — Igor Kershteyn
(74) *Attorney, Agent, or Firm* — Nixon & Vanderhye P.C.

(57) ABSTRACT

A method of cooling a double flow steam turbine includes supplying steam flow to each nozzle of the sections of the turbine; reversing a portion of each steam flow to provide a reverse steam flow from an aft side to a forward side of each section. Each reverse steam flow is directed to an annular space between a rotor and a tub. The method further includes removing the reverse steam flows through a pipe, the pipe having a first end at the annular space at a first pressure and a second end at a second pressure that is lower than the first pressure. A double flow steam turbine, includes a pair of nozzles, each nozzle being provided at a section of the turbine; a rotor supporting buckets of the sections; a tub supporting the pair of nozzles; and a pipe extending from an annular space between the tub and the rotor. The pipe has a first end at the annular space and second end. A pressure at the first end of the pipe is greater than a pressure at the second end.

10 Claims, 1 Drawing Sheet

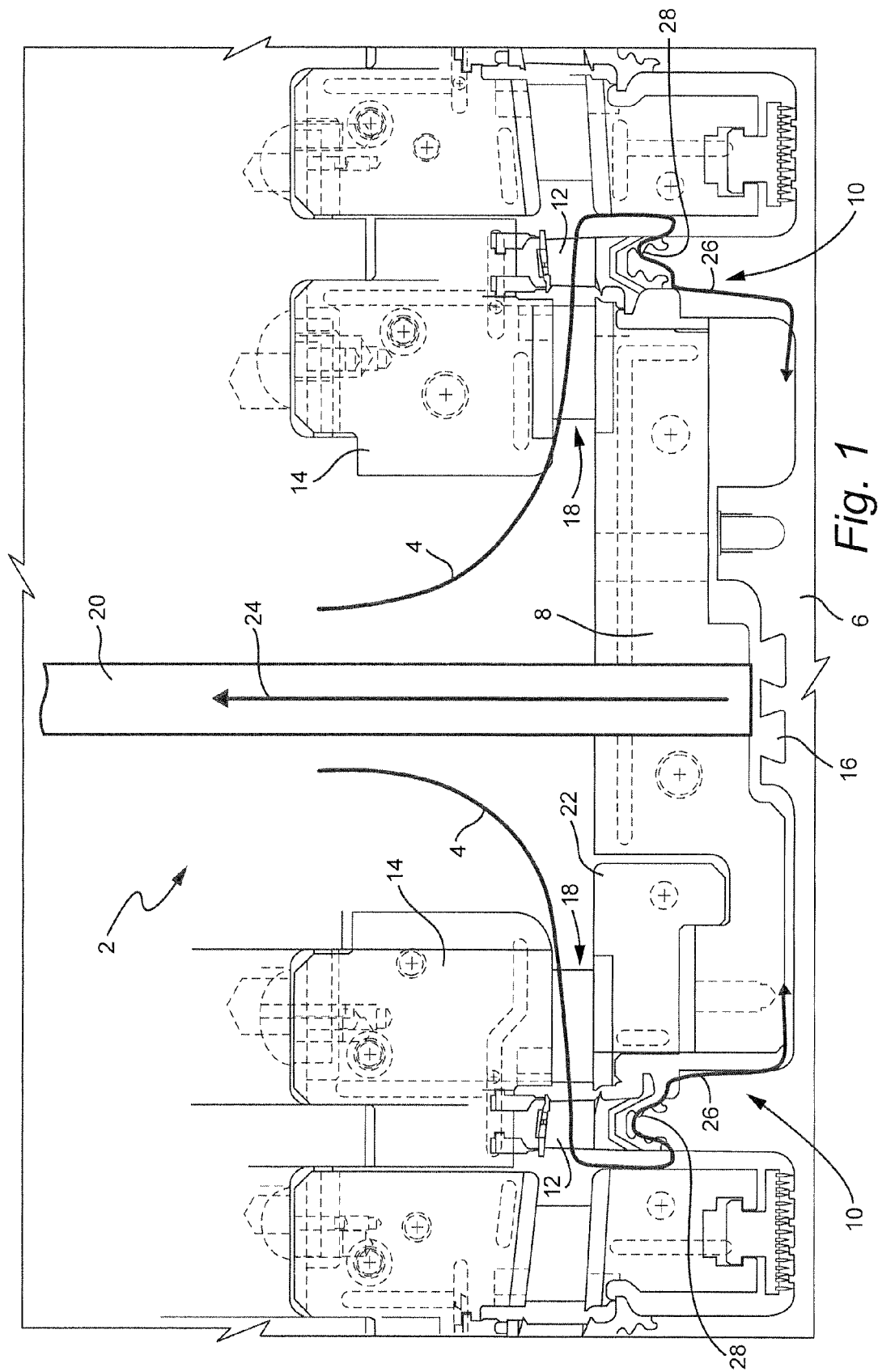

APPARATUS AND METHOD FOR DOUBLE FLOW TURBINE FIRST STAGE COOLING

FIELD OF THE INVENTION

The invention relates generally to steam turbines, and more particularly, to cooling a first stage and tub region of a double flow turbine.

BACKGROUND OF THE INVENTION

A steam turbine has a defined steam path which includes, in serial-flow relationship, a steam inlet, a turbine, and a steam outlet. Some areas in a steam turbine may become stagnant with respect to steam flow. For example, there may be insufficient driving force to provide sufficient cooling steam flow in all areas of the turbine. As a result, the area in which steam flow is stagnant may have an increased temperature.

In steam turbines, it is common to design the first stage with negative root reaction to provide steam cooling for the first wheel. The negative root reaction generates some leakage through the first stage wheel holes. In a double flow steam turbine, it is possible to have both turbine ends designed with negative root reaction. However, it is expected that some steam will be trapped in the tub region. The tub region in a double flow steam turbine may therefore become stagnant with respect to steam flow. If both ends have the same root reaction or slightly different root reactions, there will be insufficient driving force to have cross flow from one end to the other. As a result, a high temperature may occur in the tub region due to windage heating of the stagnant steam. This high temperature potentially shortens the useful life of the rotor and may lead to failure of the steam turbine.

BRIEF DESCRIPTION OF THE INVENTION

According to one embodiment, a method of cooling a double flow steam turbine comprises supplying steam flow to each nozzle of the sections of the turbine; reversing a portion of each steam flow to provide a reverse steam flow from an aft side to a forward side of each section. Each reverse steam flow is directed to an annular space between a rotor and a tub. The method further comprises removing the reverse steam flows through a pipe, the pipe having a first end at the annular space at a first pressure and a second end at a second pressure that is lower than the first pressure.

According to another embodiment, a double flow steam turbine comprises a pair of nozzles, each nozzle being provided at a section of the turbine; a rotor supporting buckets of the sections; a tub supporting the pair of nozzles; and a pipe extending from an annular space between the tub and the rotor. The pipe has a first end at the annular space and second end. A pressure at the first end of the pipe is greater than a pressure at the second end.

BRIEF DESCRIPTION OF THE DRAWINGS

FIG. 1 schematically illustrates a double flow steam turbine according to one embodiment of the invention.

DETAILED DESCRIPTION OF THE INVENTION

Referring to FIG. 1, a double, or opposed, flow steam turbine 2 comprises nozzles, or diaphragms, 18 at sections of the turbine 2. As shown in FIG. 1, steam 4 is provided to both nozzles 18 of the double flow steam turbine 2. It should be appreciated that the following description of the flow of the steam 4 applies equally to both nozzles 18 of the double flow steam turbine 2.

Referring again to FIG. 1, the steam 4 enters the nozzle 18 of each pressure section. Each nozzle 18 is defined by a nozzle outer ring 14 which is supported by an inner ring, or web, 22. The inner ring 22 is supported by a central annulus, or tub 8 that is static relative to a rotor wheel 6 of the double flow steam turbine 2. The steam 4 passes a bucket 12 that is supported by a rotor wheel dovetail projection 10. A portion 26 of the steam 4 is reversed to flow from the aft to the forward side of the first stage turbine wheel and then proceeds to an annular space 16 between the rotor wheel 6 and the tub 8. The reverse steam flow portion 26 may be provided by, for example, steam balance holes 28 either through the bucket 12 and/or the rotor wheel dovetail projections 10.

In steam turbines, it is common to design the first stage with negative root reaction to provide cooling steam for the first wheel.

In the double flow steam turbine 2, it is possible to have both turbine ends designed with negative root reaction, and some of the reverse steam flow portion 26 will be trapped in the annular space 16 in the region of the tub 8. In order to provide a sufficient driving force to have a cross flow of cooling steam from one end to the other, a pipe 20 is provided through the tub 8. The pipe 20 extends from the annular space 16 to a region of lower pressure to allow stagnant steam to exit the annular space 16. The pressure differential between the annular space 16 and the lower pressure location will force the reverse steam flow portion 26 to flow through the pipe 20 as shown by arrow 24 to avoid windage heating.

The double flow steam turbine may be a double flow non-condensing turbine, for example, as used in a desalination process. It should be appreciated, however, that the invention may be used in any double flow steam turbine that requires tub region cooling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cooling a double flow steam turbine, comprising:

supplying steam flow to each nozzle of sections of the turbine;

reversing a portion of each steam flow to provide a reverse steam flow from an aft side to a forward side of each section, wherein each reverse steam flow is directed to an annular space between a rotor and a tub; and removing the reverse steam flows through a pipe, the pipe having a first end at the annular space at a first pressure and a second end at a second pressure that is lower than the first pressure.

2. A method according to claim 1, wherein the reverse steam flows are provided through steam balance holes.

3. A method according to claim 2, wherein the steam balance holes are provided in at least one of the rotor and a bucket of the first stage of each section.

4. A method according to claim 1, wherein a first stage of each section is configured to provide a negative root reaction.

5. A method according to claim 4, wherein the first stages of the sections are configured to provide the same negative root reaction.

6. A double flow steam turbine, comprising:
- a pair of nozzles, each nozzle being provided at a section of the turbine;
- a rotor supporting buckets of the sections;
- a tub supporting the pair of nozzles; and
- a pipe extending from an annular space between the tub and the rotor, the pipe having a first end at the annular space and second end, wherein a pressure at the first end of the pipe is greater than a pressure at the second end.

7. A double flow steam turbine according to claim 6, wherein a portion of a steam flow provided to each nozzle is reversed to flow from an aft side of each section to a forward side through steam balance holes.

8. A double flow steam turbine according to claim 7, wherein the steam balance holes are provided in at least one of the rotor and the bucket of a first stage of each section.

9. A double flow steam turbine according to claim 6, wherein a first stage of each section is configured to provide a negative root reaction.

10. A double flow steam turbine according to claim 9, wherein the first stages of the sections are configured to provide the same negative root reaction.

* * * * *